Feb. 9, 1937.   B. H. BLACK   2,070,196
WATER SERVICE STAND
Filed March 8, 1935   4 Sheets-Sheet 1
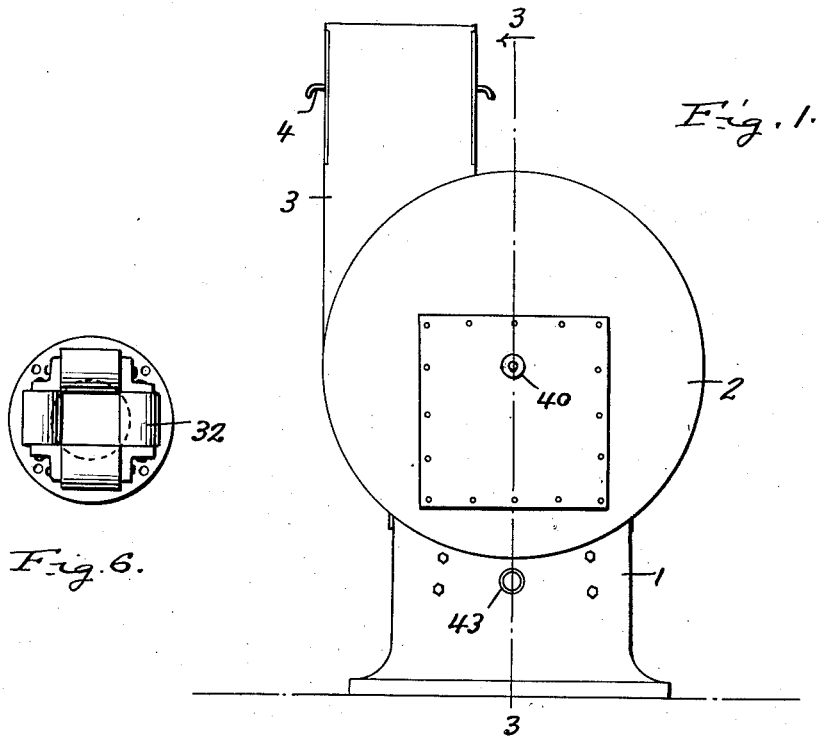
Fig. 1.
Fig. 6.
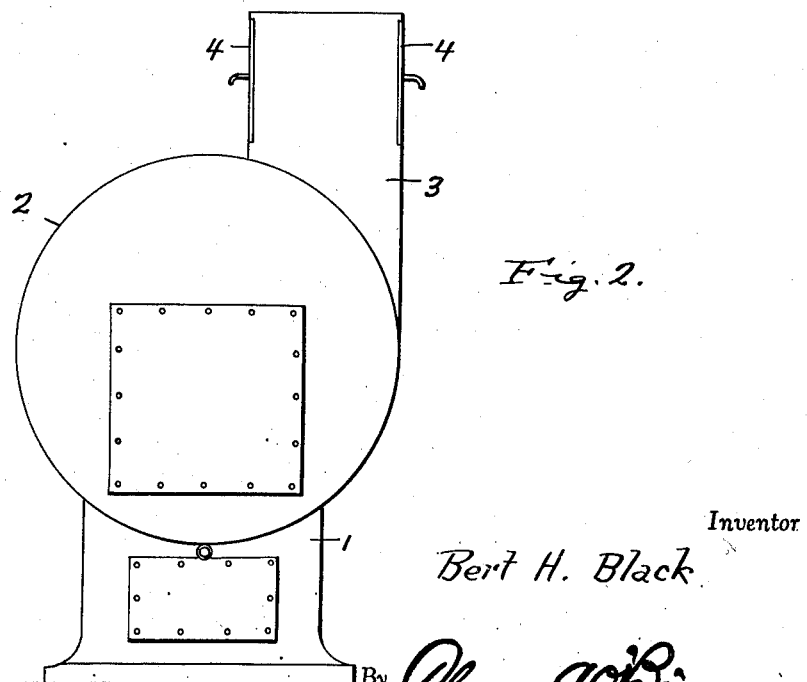
Fig. 2.
Inventor
Bert H. Black
By Clarence A. O'Brien
Attorney

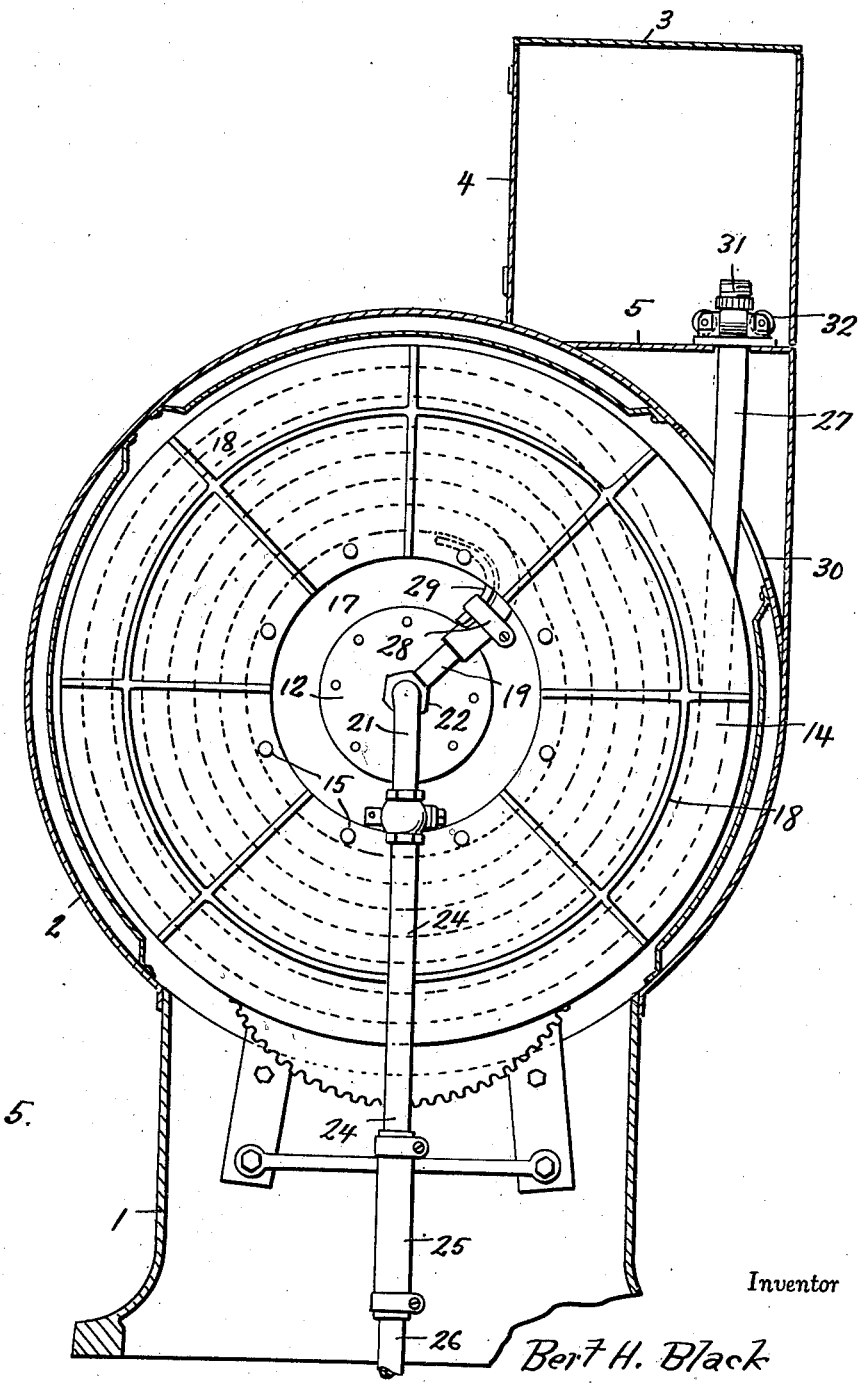

Patented Feb. 9, 1937

2,070,196

UNITED STATES PATENT OFFICE 2,070,196

WATER SERVICE STAND

Bert H. Black, Crosbyton, Tex.

Application March 8, 1935, Serial No. 10,096

2 Claims. (Cl. 299—78)

This invention relates to a device for servicing motor vehicles and the like with water at service stations, garages and the like, the general object of the invention being to provide a spring-actuated reel having a hose thereon connected with a water supply so that the hose can be readily paid from the reel to furnish a radiator of an automobile, for instance, with water, after which the hose will be rewound on the reel by the spring.

Another object of the invention is to provide means for heating the water when it is to be used in cold weather to prevent the water from freezing.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 1 is a view of one side of the device.

Fig. 2 is a view of the opposite side.

Fig. 5 is a section on line 5—5 of Fig. 3.

Fig. 6 is a top plan view of the small rollers forming the hose guide.

Figure 3:
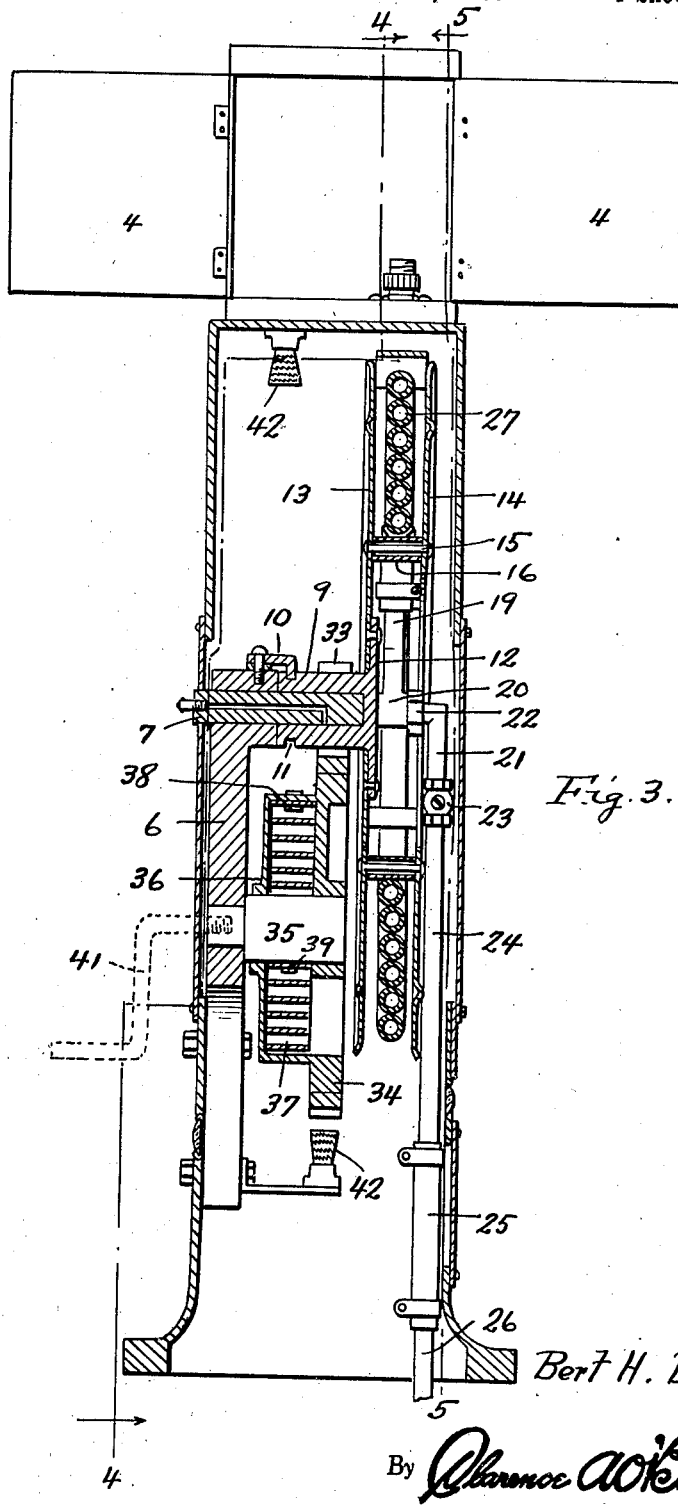
Fig. 3 is a section on line 3—3 of Fig. 1.
Figure 4:
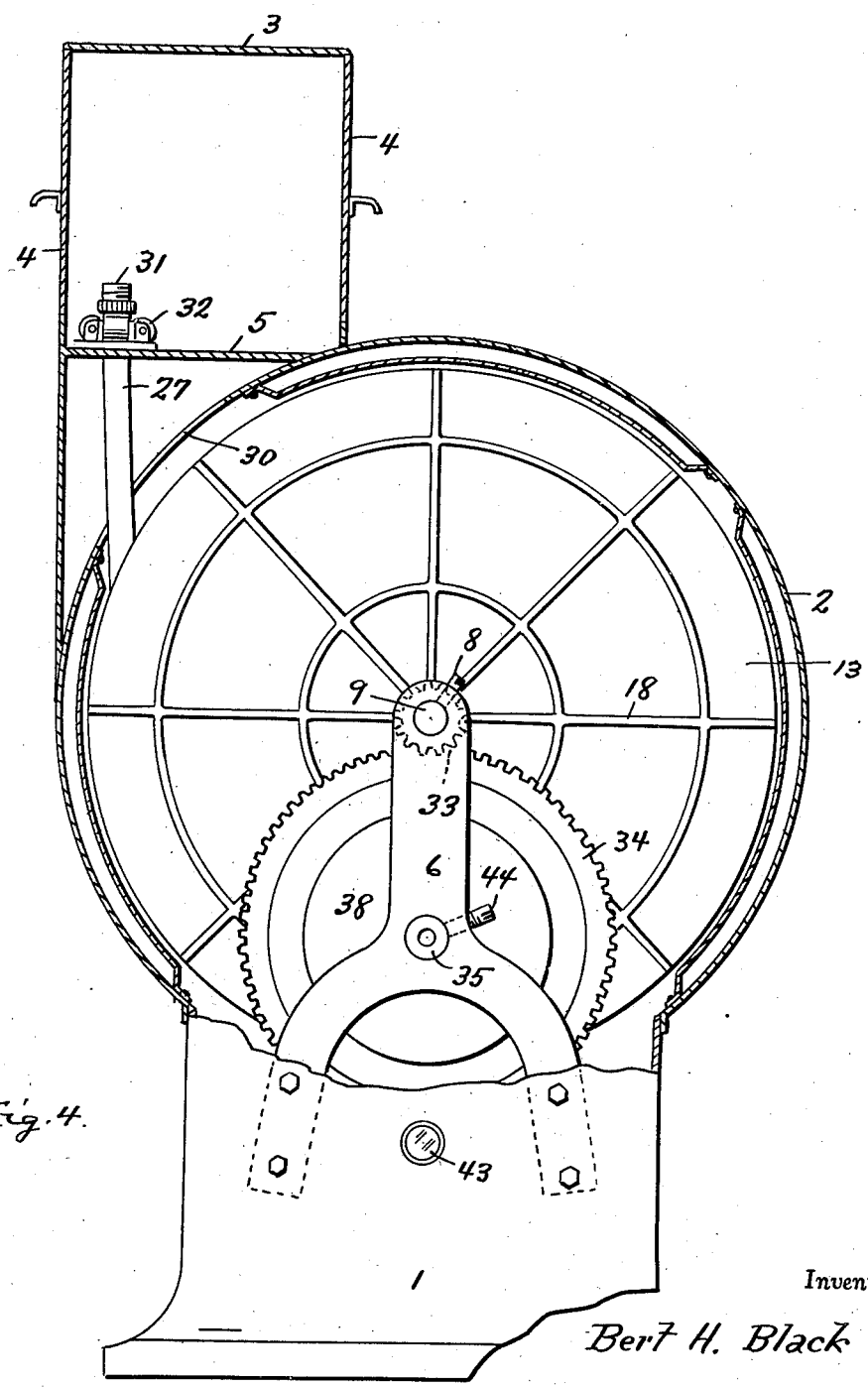
Fig. 4 is a section on line 4—4 of Fig. 3.

In these drawings, the numeral 1 indicates a base which supports a cylinder 2 which has an upstanding part 3, the upper end of which is closed and the sides of which have openings therein which are closed by the doors 4. A partition 5 forms the upper portion of the part 3 into a chamber, access to which is provided by the two pairs of doors 4.

A frame 6 is suitably supported in a part of the base 1 and the cylinder 2 and has a horizontal opening therein through which passes a shaft 7 which is held in place by one or more set screws 8. A hub 9 is rotatably arranged on the inner projecting part of the shaft and is held in place by a member 10 fastened to the top of the frame 6 and engaging a groove 11 in the hub. A disk 12 is formed with the hub and the reel disk 13 is attached to the disk 12. The other reel disk shown at 14 is connected to the disk 13 by the rivets 15 and the spacers 16. The disk 14 has a centrally arranged opening therein as shown at 17 and both disks 13 and 14 are reinforced by the ribs 18. A pipe 19 is formed with a tubular head 20 which has one end connected in any suitable manner with the center of the disk 12 and its other end to receive the end of the short arm of an L-shaped pipe 21, a packing gland 22 holding said end of the pipe 21 in the head 20 and preventing leakage of water at the joint as the reel and the pipe 19 revolve. A valve 23 is connected to the free end of the long arm of the pipe 21 and is also connected to a pipe 24 suitably supported in the casing and having its lower end connected by a short length of hose 25 with a water supply pipe 26. One end of a rubber hose 27 is connected to the outer end of the pipe 19 as shown at 28, the hose being coiled in the reel with the inner convolutions resting on the spacers 16 and a curved member 29 has a part resting on one of the spacers and its other end supported by the hose clamp 28 with the inner end of the hose passing around this curved member so that the inner end of the hose cannot be bent too short which might injure the hose and stop the water from passing through the same.

The hose passes through an opening 30 in a side wall of the cylinder 2 into the part 3 and through a hole in the partition 5 where the free end of the hose is provided with a coupling 31 so that it can be connected to a nozzle or the like. A frame carrying the small rollers 32 is supported on the partition 5 with the rollers surrounding the opening through which the hose passes and these rollers prevent the coupling from passing through the opening in the partition and also act as guide means as the hose is pulled through an opening left by the opening of one of the doors. Thus, it will be seen that by opening a pair of the doors, the hose can be partly pulled from the reel and carried to the radiator of a car or the like so that water can be introduced into the radiator. The valve 23 can be closed when repairs are to be made to the device or whenever it is necessary to turn off the water.

A pinion 33 is formed on or connected with the hub 9 and a gear 34 meshes with the pinion and is rotatably arranged on a shaft 35 rotatably supported by the frame 6 and a spring housing 36 is formed with the gear and contains the spring 37 which has one end connected with the housing as shown at 38 and its other end with the shaft as shown at 39, the parts being so arranged that when the hose is partly pulled from the reel, the spring will be wound so that when the hose is released, the spring will rewind the hose upon the reel. The outer end of the shaft is exposed through an opening 40 in the housing so that a crank handle 41, shown in dotted lines in Fig. 3, can be threaded into a hole in the outer end of the shaft 35 to permit the same to be rotated to wind the spring when the tension of the same needs to be increased.

Burners 42 are arranged in the housing formed by the parts 1 and 2 and any suitable form of fuel can be furnished these burners, such as gas or electricity, thus providing means for heating the water contained in the pipe and hose so that the water will not freeze before being introduced into the radiator of a car. Windows 43 may be provided in the housing for inspecting the burners and suitable doors may be arranged in the housing formed by the parts 1 and 2 to permit access to the parts.

The shaft 35 is normally held against rotary movement by a set screw 44 which must be loosened when the shaft 35 is to be turned by the crank 41 to tension the spring and the housing is lined with asbestos to retain the heat given off by the burners.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A water service stand, comprising a housing, a vertically arranged frame in the housing, a laterally extending stationary shaft supported by the upper part of the frame, a tubular shaft rotatably mounted on the stationary shaft and having an exterior annular groove therein, a member connected with the frame and having a part engaging the groove for holding the tubular shaft and the stationary shaft, said tubular shaft having a flange thereon, a reel disk connected with the flange, a second reel disk, means for connecting the said disk to the first reel disk in spaced relation, a radially arranged pipe having a tubular head at its inner end having one end connected with the central part of the disk carrying end of the tubular shaft, a supply pipe in the housing having a right-angularly extending end having its extremity in communication with the head, means for providing a water-tight joint between said bent end of the pipe and the head, and a hose carried by the reel and having its inner end connected to the outer end of the radial pipe, and a curved member having one end connected with the hose at the junction of the hose with the radial pipe and its other end portion supported by a part of the reel.

2. A water service stand, comprising a housing, a vertically arranged frame in the housing, a laterally extending stationary shaft supported by the upper part of the frame, a tubular shaft rotatably mounted on the stationary shaft and having an exterior annular groove therein, a member connected with the frame and having a part engaging the groove for holding the tubular shaft and the stationary shaft, said tubular shaft having a flange thereon, a reel disk connected with the flange, a second reel disk, means for connecting the said disk to the first reel disk in spaced relation, a radially arranged pipe having a tubular head at its inner end having one end connected with the central part of the disk carrying end of the tubular shaft, a supply pipe in the housing having a right-angularly extending end having its extremity in communication with the head, means for providing a water-tight joint between said bent end of the pipe and the head, and a hose carried by the reel and having its inner end connected to the outer end of the radial pipe, and a curved member having one end connected with the hose at the junction of the hose with the radial pipe and its other end portion supported by a part of the reel, a winding shaft, a spring on the winding shaft, a gear on the winding shaft, a pinion on the tubular shaft with which the gear meshes, said spring being adapted to rewind the reel when the same is released from a paid off position, said gears, tubular shaft and reel being of heat conductor material and a source of heat located under the said gear.

BERT H. BLACK.